(12) United States Patent
Zou et al.

(10) Patent No.: US 12,051,233 B2
(45) Date of Patent: Jul. 30, 2024

(54) METHOD FOR FILTERING IMAGE FEATURE POINTS AND TERMINAL

(71) Applicant: GOERTEK INC., Shandong (CN)

(72) Inventors: Libing Zou, Shandong (CN); Yifan Zhang, Shandong (CN); Baoming Li, Shandong (CN); Yue Ning, Shandong (CN)

(73) Assignee: GOERTEK INC., Shandong (CN)

( * ) Notice: Subject to any disclaimer, the term of this patent is extended or adjusted under 35 U.S.C. 154(b) by 345 days.

(21) Appl. No.: 17/595,079

(22) PCT Filed: Oct. 30, 2020

(86) PCT No.: PCT/CN2020/125271
§ 371 (c)(1),
(2) Date: Nov. 8, 2021

(87) PCT Pub. No.: WO2021/129145
PCT Pub. Date: Jul. 1, 2021

(65) Prior Publication Data
US 2022/0254146 A1 Aug. 11, 2022

(30) Foreign Application Priority Data
Dec. 26, 2019 (CN) .......................... 201911368851.0

(51) Int. Cl.
*G06V 10/774* (2022.01)
*G06N 3/084* (2023.01)
*G06V 10/46* (2022.01)

(52) U.S. Cl.
CPC ........... *G06V 10/774* (2022.01); *G06N 3/084* (2013.01); *G06V 10/46* (2022.01)

(58) Field of Classification Search
CPC ...... G06V 10/774; G06V 10/46; G06V 10/82; G06N 3/084; G06N 3/044; G06N 3/045;
(Continued)

(56) References Cited

U.S. PATENT DOCUMENTS

| 11,526,983 | B2 * | 12/2022 | Peng ..................... G06T 7/0012 |
| 2022/0157047 | A1 * | 5/2022 | Truong ................ G06V 10/764 |

FOREIGN PATENT DOCUMENTS

| CN | 104778465 A | 7/2015 |
| CN | 106372111 A | 2/2017 |

(Continued)

OTHER PUBLICATIONS

Zhang et at, RGB-D images recognition algorithm based on conventional-recursive neural network with sparse connections, Journal of Hefei University of Technology, May 28, 2018, vol. 41 No. 5, p. 582-588, Hefei CN.

(Continued)

*Primary Examiner* — Juan A Torres
(74) *Attorney, Agent, or Firm* — LKGlobal | Lorenz & Kopf, LLP (57) ABSTRACT

The present application discloses a method for filtering image feature points and a terminal. The method for filtering image feature points includes: providing quality score values to feature points extracted from an image, and according to the feature points and the quality score values of the feature points, training a neural-network model; after one time of filtering has started up, acquiring one frame of an original image and extracting feature points in the original image; inputting the original image and the feature points in the original image into the neural-network model, obtaining and outputting quality score values corresponding to the feature points in the original image; and according to the quality score values, filtering the feature points in the original image. The method for filtering image feature points can improve the success rate of the matching of the feature points in relocated application scenes, thereby improving the locating efficiency.

14 Claims, 4 Drawing Sheets

(58) Field of Classification Search
CPC ............... G06N 3/088; G06T 7/248; G06T 2207/10016; G06T 2207/20081; G06T 2207/20084; G06F 18/2113; G06F 18/214
USPC ........................................... 382/157
See application file for complete search history.

(56) References Cited

FOREIGN PATENT DOCUMENTS

| | | | |
|---|---|---|---|
| CN | 107832802 A | 3/2018 |
| CN | 108470354 A | 8/2018 |
| CN | 109215118 A | 1/2019 |
| CN | 109299304 A | 2/2019 |
| CN | 109492688 A | 3/2019 |
| CN | 109711268 A | 5/2019 |
| CN | 109978911 A | 7/2019 |
| CN | 110287873 A | 9/2019 |
| CN | 111144483 A | 5/2020 |
| WO | 2019196308 A1 | 10/2019 |

OTHER PUBLICATIONS

Xiao et al, Research on Feature Selection Algorithm Based on Minimum Word Frequency CHI, Journal of Southwest University (Natural Science Edition), Jun. 30, 2015, vol. 37 No. 6, p. 137-142.
Han et al, A CNN Based Framework for Stable Image Feature Selection, 2017 IEEE Global Conference on Signal and Information Processing, Dec. 16, 2018, p. 1402-1406, Beijing CN.
Han, Chaoyi, "A CNN Based Framework for Stable Image Feature Selection", 2017 IEEE Global Conference on Signal and Information Processing (GlobalSIP), Dec. 31, 2017, 1-19.
Li, Bing, "Rank-SIFT: Learning to Rank Repeatable Local Interest Points", CVPR'11:Proceedings of the 2011 IEEE Conference on Computer Vision and Pattern Recognition, Jun. 30, 2011.

* cited by examiner

METHOD FOR FILTERING IMAGE FEATURE POINTS AND TERMINAL

CROSS REFERENCE TO RELATED APPLICATIONS

This application is a U.S. National Stage entry under 35 U.S.C. § 371 based on International Application No. PCT/CN2020/125271, filed on Oct. 30, 2020, which was published under PCT Article 21(2) and which claims priority to Chinese Patent Application No. 201911368851.0, filed on Dec. 26, 2019. These applications are hereby incorporated herein in their entirety by reference.

TECHNICAL FIELD

This Application pertains to the technical field of image processing, and particularly relates to a method for filtering image feature points and a terminal.

BACKGROUND

With the development of the techniques of artificial intelligence and 5G communication, new terminals and applications such as service robots are increasingly extensively employed in everyday life, to provide people more convenience and services. Point-cloud-based movement-state estimation, three-dimensional reconstruction and visual locating are the core of the techniques such as SLAM (Simultaneous Localization and Mapping), and, especially in the field of SFM (Structure From Motion), the selection of excellent visual feature points facilitates to improve the locating accuracy and maintain continuous and stable movement tracking. However, in the prior art, the quantity of the feature points is large and the qualities of the feature points are unsatisfactory, and, when the target is lost in the tracking, it is difficult to quickly re-locate, which affects the efficiency and accuracy of the locating. In addition, other objects, desirable features and characteristics will become apparent from the subsequent summary and detailed description, and the appended claims, taken in conjunction with the accompanying drawings and this background.

SUMMARY

In view of the above problems, the present application is proposed to provide a method for filtering image feature points and a terminal that overcome the above problems or at least partially solve the above problems, which quantize and score the feature points by using a neural network, to effectively filter the feature points of a low quality, save the storage space and improve the locating performance.

According to an aspect of the present application, there is provided a method for filtering image feature points, comprising:
providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;
after one time of filtering has started up, acquiring one frame of an original image and extracting feature points in the original image;
inputting the original image and the feature points in the original image into the neural-network model, obtaining quality score values corresponding to the feature points in the original image and outputting the quality score values corresponding to the feature points in the original image; and
according to the quality score values corresponding to the feature points in the original image and a preset filtering rule, filtering the feature points in the original image.

According to another aspect of the present application, there is provided a terminal, wherein the terminal comprises a device for filtering image feature points, wherein the device for filtering image feature points comprises:
a model training module, configured for providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;
a feature extracting module, configured for after one time of filtering has started up, acquiring one frame of an original image and extracting feature points in the original image;
a score-value determining module, configured for inputting the original image and the feature points in the original image into the neural-network model, obtaining quality score values corresponding to the feature points in the original image and outputting the quality score values corresponding to the feature points in the original image; and
a filtering module, configured for according to the quality score values corresponding to the feature points in the original image and a preset filtering rule, filtering the feature points in the original image.

According to yet another aspect of the embodiments of the present application, there is provided a computer readable storage medium, wherein the computer readable storage medium stores a computer program, and the computer program causes a computer to execute the method for filtering image feature points in the above process embodiment.

The method for filtering image feature points and the terminal according to the embodiments of the present application, in an aspect, by using the technical features of providing the quality score values to the feature points, quantizing and scoring the feature points by using the neural network and so on, effectively filter the feature points of a low quality, to reduce the quantity of the feature points, thereby reducing the demand on calculation and the storage resource, and, in another aspect, the scoring mode of combining the feature points in the current frame and the tracking frames does not only take into consideration the current weight of the feature points, but also takes into consideration the long-term utility of the feature points, thereby improving the filtering performance.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present application will be described in further detail below by referring to the drawings. Although the drawings illustrate the exemplary embodiments of the present application, it should be understood that the present application can be implemented in various forms, which should not be limited by the embodiments illustrated herein. In contrast, the purpose of providing those embodiments is to more clearly understand the present application, and to completely convey the scope of the present application to a person skilled in the art.

The method for filtering image feature points according to the embodiments of the present application is applied to fields such as sparse-point-cloud-based movement-state estimation, three-dimensional reconstruction and visual locating, and is the key to the techniques such as Visual SLAM, virtual reality and deep learning. Visual SLAM (also referred to as V-SLAM) refers to acquiring environment images by using a visual sensor, extracting feature points, constructing a point-cloud map, and realizing locating and navigation on that basis. Feature-point filtering is a step of the V-SLAM locating and tracking, and is particularly a process of, based on feature-point extraction, filtering the extracted feature points. Currently, the point-cloud generation in tracking and locating has two approaches, which are the traditional method based on artificial feature points and a method based on automatic feature points in a deep neural network. The method based on artificial feature points has a clear theoretical basis, is easily understandable, and has a low computational complexity. However, in practical applications, the feature points are easily affected by the factors such as the texture, the lighting and the definition, which results in the technical problems such as an unreasonable feature-point extraction and a poor tracking effect. However, the method of feature-point extraction based on a deep neural network utilizes the excellent stability and robustness of the deep neural network, and the extracted feature points have an excellent adaptability to the environment and a good tracking effect. Therefore, it is currently a research hotspot.

The feature-point processing based on a deep neural network refers to extracting the feature points in an image by using an LSTM (Long Short-Term Memory) or CNN (Convolutional Neural Networks) network, and generating a feature descriptor, thereby constructing a point cloud and on that basis realizing tracking and re-locating. It can be seen from the actual effects that the method of generating a feature point cloud based on a deep neural network has an excellent environmental suitability, has a good anti-interference performance, and has no easy losing in the tracking, but there may probably be a poor behavior of the re-locating if losing happens in the tracking. The inventor of the present application has found by analysis that the primary reason of such a phenomenon is that, in the feature-point selection (when training model), merely the relevance of the features in the prior and subsequent frames of images is considered, but the long-term tracking performance when the point is selected as a feature point to construct the feature point cloud is not taken into consideration, which results in that, when the target is lost in the tracking, it is difficult to quickly re-locate. Furthermore, the quantity of the feature points is not filtered, which makes the point cloud too dense, which increases the storage space, and the too dense point cloud also increases the retrieval time.

In order to solve the above technical problems, the present application provides a solution for evaluating and filtering the qualities of feature points based on a deep neural network. Based on the technical solution, the quantizing and scoring of the qualities of the feature points can be realized. In practical applications, the feature points may be filtered and screened according to the score values. For example, in the stage of constructing the V-SLAM point cloud, the technical solution may be applied to thin the point cloud, by reserving the important feature points, to reduce the storage space of the point-cloud map, and realize the compression of the point cloud. Furthermore, in the stage of V-SLAM re-locating, because the evaluation mechanism of the feature points according to the embodiments of the present application refers to the long-term utility, the success rate of the matching of the feature points can be increased, thereby improving the searching speed and the locating accuracy in the re-locating stage of the V-SLAM, to satisfy the practical demands.

Figure 1:
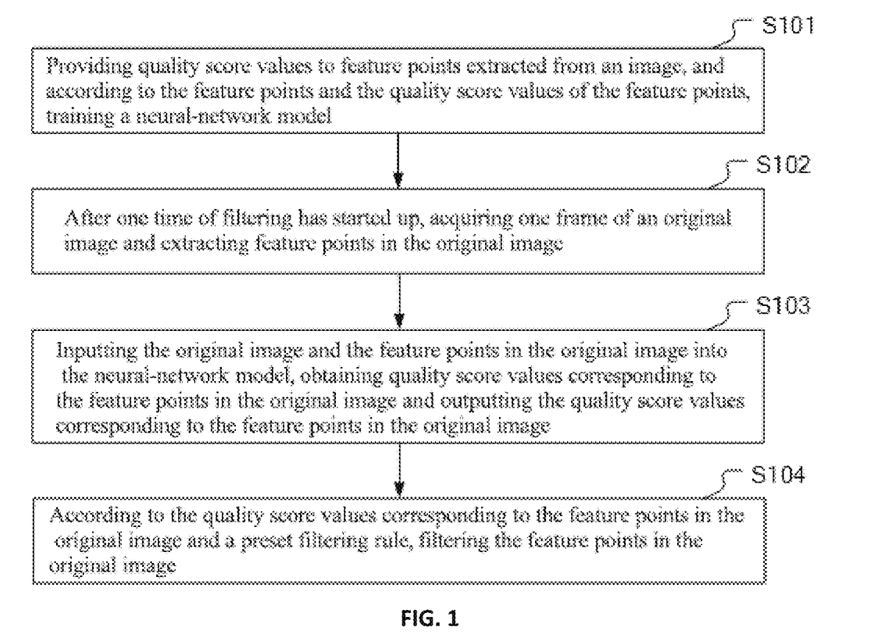
FIG. 1 shows a schematic flow chart of the method for filtering image feature points according to an embodiment of the present application.

FIG. 1 shows a schematic flow chart of the method for filtering image feature points according to an embodiment of the present application. Referring to FIG. 1, the method for filtering image feature points according to the present embodiment comprises the following steps:

step S101: providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked.

In the present embodiment, firstly, the feature points are newly added the parameter of quality score value, which is used to quantize and evaluate the values of the feature points. The quality score value may have a predicted initial value, but, each time the image data are inputted into the neural network to train, the quality score value of a feature point in the current-frame image is determined by the quality score values of the feature points in both of the current frame and the tracking frames. Such a mode takes into consideration the value of the next frame of image of the current-frame image, balances the value of the next one frame and the subsequent successive multiple frames of images for this time of filtering, and improves the filtering accuracy.

step S102: after one time of filtering has started up, acquiring one frame of an original image and extracting feature points in the original image.

step S103: inputting the original image and the feature points in the original image into the neural-network model, obtaining quality score values corresponding to the feature points in the original image and outputting the quality score values corresponding to the feature points in the original image.

step S104: according to the quality score values corresponding to the feature points in the original image and a preset filtering rule, filtering the feature points in the original image.

It can be known from FIG. 1 that the method for filtering image feature points according to the present embodiment realizes the advantageous effect of providing the quality score values to the feature points, in turn quantizing and scoring the qualities of the feature points by using the neural network and, according to the quality score values, filtering the feature points, and improves the efficiency of the navigation and locating of the terminal. Furthermore, when quantizing and scoring the qualities of the feature points, the scoring mode of combining the feature points in the current frame and the tracking frames does not only take into consideration the current weight of the feature points, but also takes into consideration the long-term utility of the feature points (i.e., the behavior and value of a certain feature point in the subsequent frames), thereby improving the filtering performance, and ensuring the locating accuracy.

In order to improve the predicting performance of the neural-network model, the present embodiment employs an unsupervised learning mode, which does not require to artificially label the samples, and, by on-line learning and training, dynamically updates the neural-network model, to continuously improve the accuracy of the neural-network model. In other words, in the present embodiment, the step of, according to the feature points and the quality score values of the feature points, training the neural-network model comprises: according to the image, the feature points in the image and the quality score values corresponding to the feature points in the image, generating a sample, training the neural-network model by using the generated sample, and updating predicted values of the quality score values of the neural-network model, to be used in a next time of filtering.

Here, the predicted value of the quality score value is one of the parameters of the neural-network model, and in the initializing process of the neural-network model, the predicted value of a quality score value is a default value. In the present embodiment, by generating the samples, the neural-network model is trained to update the default value, thereby improving the accuracy of the model at the predicting stage, to ensure that the neural-network model can, after being inputted the image data to be filtered, predict more accurate quality score values of the feature points.

Figure 2:
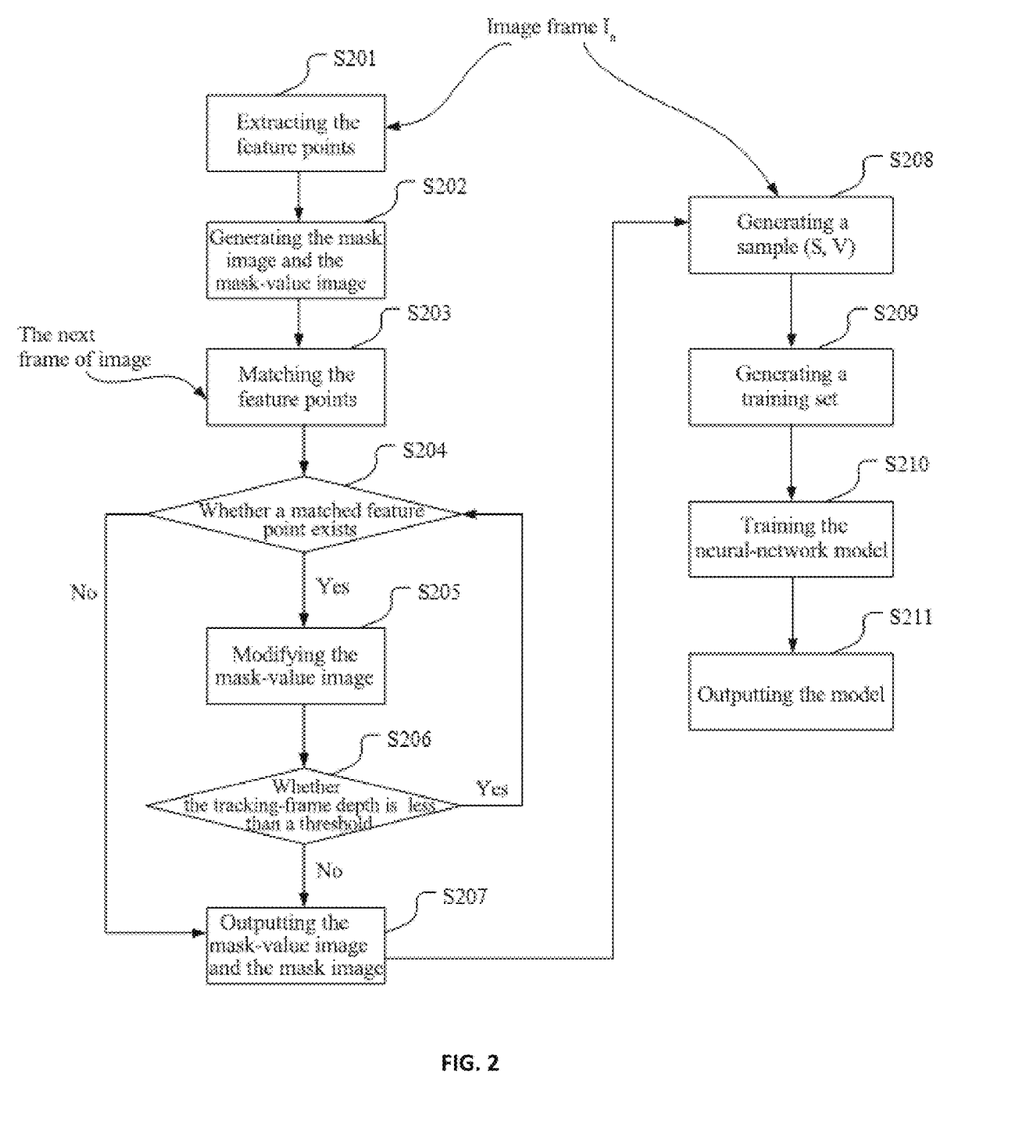
FIG. 2 shows a schematic flow chart of the training of the neural-network model according to an embodiment of the present application.

FIG. 2 shows a schematic flow chart of the training of the neural-network model according to an embodiment of the present application. The process of training the neural-network model according to the embodiment of the present application is explained below with reference to FIG. 2.

Referring to FIG. 2, regarding an image frame $I_n$, firstly a step S201 is executed: extracting the feature points.

Here, the image frame is, for example, one frame of an original image. The original image is relative to the mask image and the mask-value image that will be generated subsequently. Here, the extraction of the feature points may be implemented by using the existing ORB-SLAM or other feature-point extracting algorithms, which is not explained in detail here. ORB-SLAM is a visual SLAM (Simultaneous Localization and Mapping) that is based on the ORB (Oriented FAST and Rotated BRIEF) descriptor. The feature detection operator is proposed based on the FAST feature detection and the BRIEF feature descriptor, its runtime is greatly superior to those of SIFT and SURF, and can be applied to real-time feature detection. The ORB feature detection has scale invariance and rotation invariance, and also has invariance in noise and perspective transformation.

After the feature points have been obtained by the extraction, the feature points may be stored into a feature-point set $P_n$.

step S202: generating the mask image and the mask-value image.

After the feature points in the image have been obtained by the extraction, in this step, according to the image $I_n$ and the feature points in the image $I_n$, a mask image is obtained, wherein the values of the pixel points in the mask image that correspond to the feature points are 256 (merely as an example), and values of remaining pixel points are 0 (merely as an example). Furthermore, according to the image, the feature points in the image and the quality score values corresponding to the feature points in the image, a mask-value image is obtained, wherein values of pixel points in the mask-value image that correspond to the feature points are the quality score values corresponding to the feature points. Here, the process of, according to the original image, the feature points and the quality score values corresponding to the feature points, obtaining the mask-value image is implemented based on the providing of the quality score values to the feature points extracted from the image.

Figure 3:
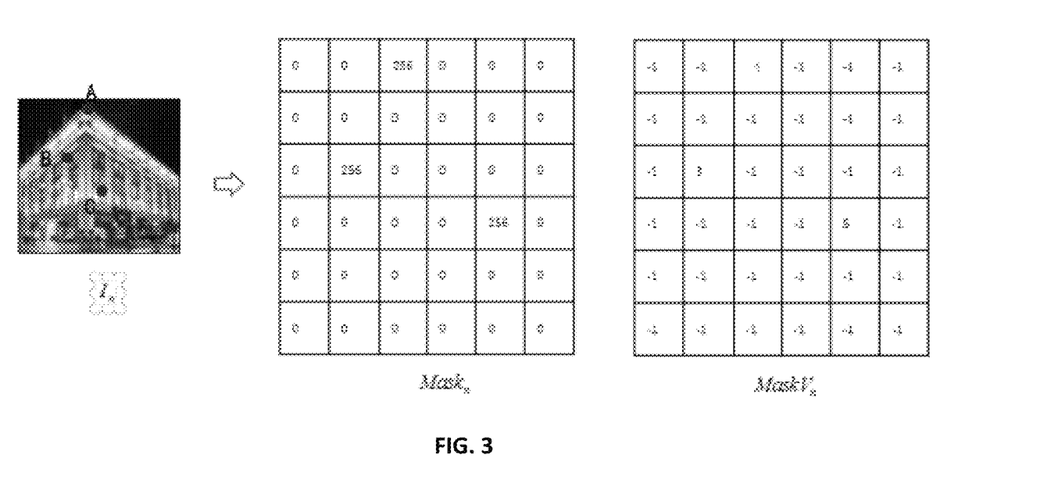
FIG. 3 shows a schematic diagram of the original image, the mask image and the mask-value image according to an embodiment of the present application.

FIG. 3 shows a schematic diagram of the original image, the mask image and the mask-value image according to an embodiment of the present application. Referring to FIG. 3, the leftmost image $I_n$ is the original image, and it can be seen that the three feature points extracted from the original image are the feature point A, the feature point B and the feature point C. In the present embodiment, the mask image $Mask_n$ and the mask-value image $MaskV_n$, which have the equal sizes, are constructed with the width and the height of the original image $I_n$ as the standards, wherein the mask image may refer to the image in the middle of FIG. 3, and the mask-value image may refer to the rightmost image in FIG. 3. In the process of setting the initial values, the values of the points at the corresponding positions in the mask image $Mask_n$ of the feature points in the above-described set $P_n$ are set to be 256 (merely as an example), and the values of the points at the corresponding positions in the mask-value image $MaskV_n$ of the feature points are set to be 1 (or individually set to be 1, 3 and 5). At the same time, the values of the corresponding points of the other pixels in the mask image $Mask_n$ are set to be 0, and the values of the other pixels in the mask-value image $MaskV_n$ are set to be −1. In other words, by setting the quality score values of the points at the pixel points corresponding to the feature points, and setting the other pixel points to be the same value, the pixel points corresponding to the feature points and the remaining pixel points are distinguished, and subsequently merely the pixel points corresponding to the feature points are concerned, to improve the efficiency of the algorithm.

Accordingly, it can be known that the mask image stores the information with respect to the pixel positions and the grayscale values of the feature points in the original image, and the mask-value image stores the information with respect to the pixel positions and the quality score values of the feature points in the original image.

The generation of the mask image and the mask-value image facilitates the information processing, and enables the neural-network model to specifically extract the information hidden in the mask image and the mask-value image.

Referring to FIG. 3, the pixel point that corresponds to the feature point A in the mask-value image MaskV$_n$ in FIG. 3 is the point at the first row and the third column, and the quality score value of the point is 1. The pixel point that corresponds to the feature point B is the point at the third row and the second column, and the quality score value of the point is 3. The pixel point that corresponds to the feature point C is the point at the fourth row and the fifth column, and the quality score value of the point is 5. It should be noted that, in the present embodiment, the step of providing the quality score values to the feature points extracted from the image comprises setting a same initial value or different initial values to the quality score values of the feature points extracted from the image. Taking the same initial value of 1 as an example, the reason why the quality score values of the three feature points in the left figure of FIG. 3 are different is that the utilities of the three feature points in the tracking subsequent to the current frame are different, or, in other words, the significances of the three feature points in the tracking frames subsequent to the original image are different. That is the principle of the present application for quantizing, scoring and filtering the feature points.

step S203: matching the feature points.

The next frame of image is read in, and a first feature point that is extracted from the current frame I$_n$ and a second feature point that is extracted from the next frame of image I$_{n+1}$ are matched. The matching of the feature points may be implemented by using the prior art. The present embodiment concerns the result of the matching of the feature points, i.e., whether there are feature points that are successfully matched.

step S204: whether a matched feature point exists; and, if yes, executing the step S205, and, if not, i.e., if the quantity of the feature points that are matched is 0, executing the step S207.

In this step, it is judged whether two neighboring frames have a matched point (i.e., a feature point that has been successfully matched), and if the quantity of the matched points is equal to 0, which indicates that the two neighboring frames do not have a matched point, the step S207 is directly executed. In other words, when the image and a next image frame of the image do not have therebetween a feature point that has been successfully matched, do not track the feature point extracted from the image, but directly, according to the image, the mask image and the mask-value image, the sample is generated.

If the two neighboring frames (i.e., the current frame and the next one frame) have a matched point, for example, having three matched points, the mask-value image of the current-frame image is modified according to this time of tracking result.

step S205: modifying the mask-value image.

This step comprises, when the image I$_n$ and the next frame of image I$_{n+1}$ of the image I$_n$ have a feature point that has been successfully matched, tracking the feature points extracted from the image I$_n$; and in the process of the tracking, performing summation operation to the quality score value of the feature point in the current frame I$_n$ and the quality score values of the feature point in the tracking frames, obtaining the sum value, and replacing the quality score value corresponding to the feature point in the mask-value image by the sum value; wherein the quality score value in each tracking frame is determined according to a product of the quality score value of the feature point in the previous one frame of the tracking frame times a discount factor, wherein the discount factor is a constant greater than 0 and less than 1.

Referring to FIG. 2, the tracking is a circulated process, and one time of the tracking comprises the step S203 to the step S206, which is reading in the next one frame→executing the step S203: matching the feature points in the next one frame and the feature points in the current frame→if there is a matched point, executing the step S205: modifying the mask value (quality score value) of the matched point in the mask-value image of the current frame→if the tracking-frame depth is not reached (in other words, the judgement result of the step S206 in FIG. 2 is no), returning to the step S203 and continuing tracking, or, if the tracking-frame depth is reached (in other words, the judgement result of the step S206 in FIG. 2 is yes), the tracking ending. The condition of the exiting of the tracking circulation is that the depth of the currently tracked frame reaches a preset tracking-frame depth. The so-called tracking-frame depth refers to the quantity of the frames subsequent to the current frame that are continuously tracked and processed. For example, if continuous k frames subsequent to the current frame are tracked, the k is the depth threshold, wherein the k is a natural number greater than 0.

The tracking embodies the inventive concept of the present application of "accumulating the discounting return", emphasizes the value of the next frame of image of the current frame, balances the values of the next one frame and the subsequently successive image frames to this time of image estimation, and facilitates to improve the locating accuracy.

Particularly, the process comprises, in the process of each time of the tracking, performing summation operation to the quality score value of the feature point in the current frame and the quality score values of the feature point in the tracking frames, obtaining the sum value, and replacing the quality score values corresponding to the feature points in the mask-value image of the current frame by the sum value.

For example, the quality score values of the feature points in the current frame in each time of the tracking are updated by using the following updating formula:

$$V = \sum_{s=0}^{k} \lambda^s v$$

wherein 0<λ<1 and λ is the discount factor, v is the quality score value of the previous one frame of each of the tracking frames, s is a tracking-frame depth, k is a threshold of the tracking-frame depth.

For example, if the k is equal to 4, that means that successive 4 frames are tracked subsequent to the current frame.

According to the above description, the initial value of the v is the quality score value 1 corresponding to the feature point in the mask-value image. The s equal to 0 represents "not tracked"; in other words, the image frame is the current frame. The V represents the sum value, and then regarding the current frame, its sum value V is equal to 1*1, i.e., 1. That is consistent with, as described above, that the initial values of the quality score values corresponding to the feature points in the mask-value image are 1.

When the tracking-frame depth s is equal to 1, considering the quality score values of the current frame and the next frame, the quality score values of the feature points in the current frame are 1, and the quality score values of the feature points in the next frame are equal to the quality score values of the current frame plus λ.

When the tracking-frame depth s is equal to 2, that indicates that the successive 2 frames subsequent to the current frame are tracked, which are referred to as the next frame and the next second frame. The quality score values of the feature points in the current frame are determined according to all of the current frame, the next frame and the next second frame. As stated above, the quality score values of the feature points in the current frame are 1, the quality score values of the next frame are equal to the quality score values of the current frame plus λ (i.e., 1+λ), and the quality score values of the next second frame are equal to the quality score values of the current frame plus the quality score values of the next frame then plus the product of λ to the power of 2 times v (v=1).

The rest can be done in the same manner.

step S206: whether the tracking-frame depth is less than a threshold; and, if yes, executing the step S207, and if not, returning to perform the step S204.

Each time the tracking has succeeded once, the tracking-frame depth is added by +1, and it is judged whether the tracking-frame depth after the accumulation reaches the threshold of the tracking-frame depth. If the threshold of the tracking-frame depth is reached, the tracking is stopped, and if not, the tracking is continued, to update the quality score value of the current frame. In other words, the sum of the quality score values of the tracking frames and the quality score value of the current frame is calculated out, and when all of the tracking has ended, the final sum value (i.e., the sum value V of the latest frame that has been tracked) is used to replace the values of the pixel points corresponding to the feature points in the mask-value image shown in FIG. 3, to obtain the quality score values of the feature points in the current frame. For example, after the sum-value replacement according to the above tracking process, the quality score value of the pixel point corresponding to the feature point B is 3, and the quality score value of the pixel point corresponding to the feature point C is 5. Accordingly, it can be determined that the quality score values of the three feature points A, B and C in the original image are different.

step S207: outputting the mask-value image and the mask image.

Based on the step S206, if the tracking succeeds, the mask-value image whose mask value has been modified is outputted, for example, the rightmost mask-value image shown in FIG. 3. If the tracking fails, the original mask-value image is outputted (the mask value in the original mask-value image is the initial value, and has not been tracked and modified).

Furthermore, in this step the mask image is also outputted to generate the sample.

step S208: generating a sample (S, V).

In other words, here, the image, the mask image and the mask-value image are combined to generate the sample. Then, the sample (S, V) is outputted to the sample set Φ, wherein S={original frame $I_n$, $Mask_n$}, and V=$MaskV_n$.

step S209: generating a training set.

The sample set Φ is sampled according to a certain proportion to generate the training set, a validation set and a test set.

step S210: training the neural-network model.

In the present embodiment, the step comprises adding to the neural-network model a first input channel for receiving the mask image and a second input channel for receiving the mask-value image; and inputting the images in the sample into the neural-network model via the input channels of the neural-network model, inputting the mask image and the mask-value image into the neural-network model respectively via the first input channel and the second input channel, based on a mean-square-error loss function, calculating an error between the quality score values in the mask-value image in the sample and the predicted values of the quality score values of the neural-network model, and according to the error determining new predicted values of the quality score values of the neural-network model, to realize updating the predicted values of the quality score values of the neural-network model.

In other words, on the basis that the image (the image is a color image) comprises the triple RGB channels of red, green and blue, two input channels are added for a mask-image layer and a mask-value-image layer, and the image, the mask image and the mask-value image are inputted into the neural network via those input channels. Optionally, the backbone network of the neural-network model is constructed based on VGG16, wherein the VGG16 is a network that has been pre-trained based on the ImageNet image library of a large quantity of realistic images.

Optionally, the loss function of the neural-network model is a mean-square-error loss function, i.e., as shown in the following:

$$MSE(y, y') = \frac{\sum_{i=1}^{n} (y_i - y'_i)^2}{n}$$

wherein $y_i'$ is the predicted values of the quality score values of the neural-network model, and $y_i$ is V, i.e., the value in the mask-value image $MaskV_n$ of the sample. The predicted values of the quality score values of the neural-network model are determined when the training process of the neural-network model ends, and, particularly, the predicted value whose difference from the mask value in the sample is minimal is used as the predicted values of the quality score values when the training of the neural-network model ends.

step S211: outputting the model.

By using the BP (Error Back Propagation) algorithm, the neural-network model for predicting the quality score values of the feature points is finally generated and outputted.

The basic idea of the BP algorithm is as follows. The learning process consists of two processes, the forward propagation of the signal and the back propagation of the error. In the forward propagation, the inputted sample is inputted from the output layer, layer-by-layer processed by hidden layers, and then transmitted to the output layer. If the actual output of the output layer is discrepant with the desired output, the process is transferred to the stage of the back propagation of the error. Such a process of adjusting the weight values of the layers comprising the forward propagation of the signal and the back propagation of the error is performed in cycles, and the process of the continuous adjusting of the weight values is the process of the learning and training of network. Such a process proceeds till the error outputted by the network has been reduced to an acceptable level, or till a preset learning time quantity has been reached.

At this point, the model training or updating has been completed, and the filtering by using the model is described below.

Figure 4:
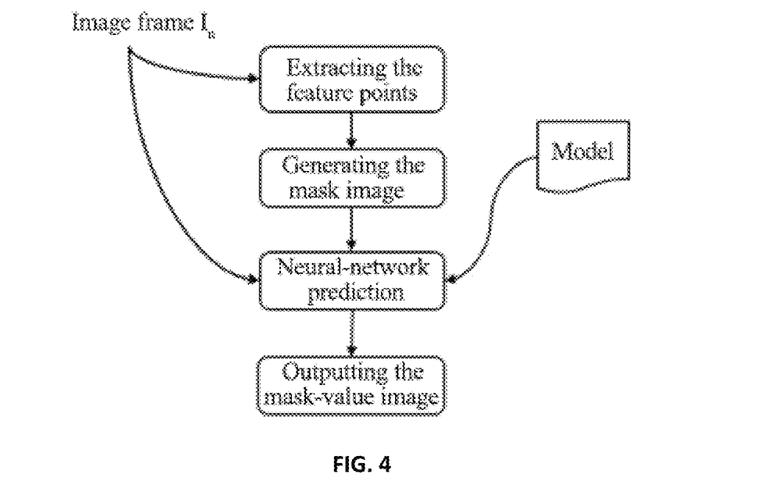
FIG. 4 shows a schematic flow chart of using the neural-network model to predict the quality score values corresponding to feature points according to an embodiment of the present application.

FIG. 4 shows a schematic flow chart of using the neural-network model to predict the quality score values corresponding to feature points according to an embodiment of the present application. Referring to FIG. 4, the process comprises, firstly, in one time of the filtering process, acquiring one frame of an original image (for example, the image frame $I_n$ in FIG. 4) and extracting feature points in the original image;

subsequently, according to the step S202, generating the mask image;

subsequently, combining the mask image and the original image (i.e., combining into the S), and inputting the combined the mask image and the original image to the neural-network model, and performing the neural-network prediction; i.e., inputting into the neural-network model both of the original image and the mask image recording the feature points in the original image; wherein the original image refers to the image to be filtered that is acquired in the filtering process;

subsequently, outputting by the neural-network model the mask-value image (i.e., outputting the mask-value image V), wherein the mask-value image refers to the image that is outputted by the neural-network model and includes the information with respect to the quality score values corresponding to the feature points in the image, and, after the mask-value image has been obtained, determining the quality score values corresponding to the feature points in the original image; and finally, according to the quality score values corresponding to the feature points in the original image and a preset filtering rule, filtering the feature points in the original image.

In practical applications, the filtering rule may be preset according to the demands. For example, the step of, according to the quality score values corresponding to the feature points in the original image and the preset filtering rule, filtering the feature points in the original image comprises: when the preset filtering rule is a threshold filtering rule, filtering out feature points in the original image whose quality score values are not greater than a preset quality-score-value threshold; and when the preset filtering rule is a ranking filtering rule, according to magnitudes of the quality score values corresponding to the feature points in the original image, performing descending sorting to the feature points in the original image, and filtering out a preset quantity of the feature points in the original image that have low ranks.

Accordingly, it can be known that the process according to the present embodiment may sort the feature points according to the mask-value image (for example, by using a reverse sorting from higher to lower, wherein a higher value indicates a higher significance level), and in turn, by referring to the filtering rule, finally complete the filtering of the feature points, for example, filtering out all of the feature points below a certain threshold. That realizes the filtering of the feature points based on the mask value.

It should be noted that, considering the practical applications, not all of application scenes require to filter the feature points. The process according to the present embodiment, before predicting the quality score values of the image feature points by using the neural-network model, according to the starting-up rule (for example, in a dense-point-cloud algorithm, the filtered of the feature points is not started up), judging whether it is required to start up the process of filtering the feature points; and if yes, executing the step shown in FIG. 4, and if not, directly processing the extracted image feature points according to the practical demands, thereby extending the application scenes of the filtering of the image feature points according to the present embodiment.

Figure 5:
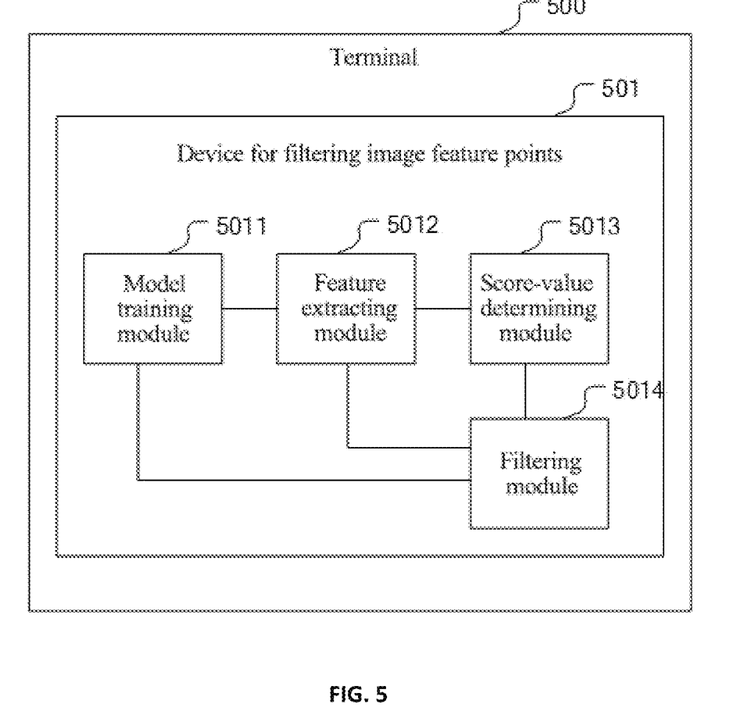
FIG. 5 shows a block diagram of the terminal according to an embodiment of the present application.

FIG. 5 shows a block diagram of the terminal according to an embodiment of the present application. Referring to FIG. 5, the terminal 500 comprises a device for filtering image feature points 501, and the device for filtering image feature points 501 comprises:

a model training module 5011, configured for providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;

a feature extracting module 5012, configured for after one time of filtering has started up, acquiring one frame of an original image and extracting feature points in the original image;

a score-value determining module 5013, configured for inputting the original image and the feature points in the original image into the neural-network model, obtaining quality score values corresponding to the feature points in the original image and outputting the quality score values corresponding to the feature points in the original image; and a filtering module 5014, configured for according to the quality score values corresponding to the feature points in the original image and a preset filtering rule, filtering the feature points in the original image.

In an embodiment of the present application, the model training module 5011 is configured for according to the image, the feature points in the image and the quality score values corresponding to the feature points in the image, generating a sample, training the neural-network model by using the generated sample, and updating predicted values of the quality score values of the neural-network model, to be used in a next time of filtering.

In an embodiment of the present application, the model training module 5011 is particularly configured for setting a same initial value or different initial values to the quality score values of the feature points extracted from the image.

In an embodiment of the present application, the model training module 5011 is particularly configured for according to the image and the feature points in the image, obtaining a mask image; wherein the values of the pixel points in the mask image that correspond to the feature points are 256, and values of remaining pixel points are 0; according to the image, the feature points in the image and the quality score values corresponding to the feature points in the image, obtaining a mask-value image, wherein values of pixel points in the mask-value image that correspond to the feature points are the quality score values corresponding to the feature points; and according to the image, the mask image and the mask-value image, generating the sample.

In an embodiment of the present application, the model training module 5011 is particularly configured for when the image and a next image frame of the image have therebetween a feature point that has been successfully matched, tracking the feature point extracted from the image; and in the process of the tracking, performing summation operation to the quality score value of the feature point in the current frame and the quality score values of the feature point in the tracking frames, obtaining the sum value, and replacing the quality score value corresponding to the feature point in the mask-value image by the sum value; wherein the quality score value in each tracking frame is determined according to a product of the quality score value of the feature point in the previous one frame of the tracking frame times a discount factor, wherein the discount factor is a constant greater than 0 and less than 1.

In an embodiment of the present application, the model training module 5011 is particularly configured for adding to the neural-network model a first input channel for receiving the mask image and a second input channel for receiving the mask-value image; and inputting the images in the sample into the neural-network model via the input channels of the neural-network model, inputting the mask image and the mask-value image into the neural-network model respectively via the first input channel and the second input channel, based on a mean-square-error loss function, calculating an error between the quality score values in the mask-value image in the sample and the predicted values of the quality score values of the neural-network model, and according to the error determining new predicted values of the quality score values of the neural-network model, to realize updating the predicted values of the quality score values of the neural-network model.

In an embodiment of the present application, the model training module 5011 is particularly configured for when the image and a next image frame of the image do not have therebetween a feature point that has been successfully matched, not tracking the feature point extracted from the image, but directly, according to the image, the mask image and the mask-value image, generating the sample.

In an embodiment of the present application, the filtering module 5014 is particularly configured for when the preset filtering rule is a threshold filtering rule, filtering out feature points in the original image whose quality score values are not greater than a preset quality-score-value threshold; and when the preset filtering rule is a ranking filtering rule, according to magnitudes of the quality score values corresponding to the feature points in the original image, performing descending sorting to the feature points in the original image, and filtering out a preset quantity of the feature points in the original image that have low ranks.

It should be noted that the particular embodiments of the filtering of the image feature points of the above terminal embodiment may refer to the particular embodiments of the above corresponding embodiments of the method for filtering image feature points, and are not discussed here further.

Figure 6:
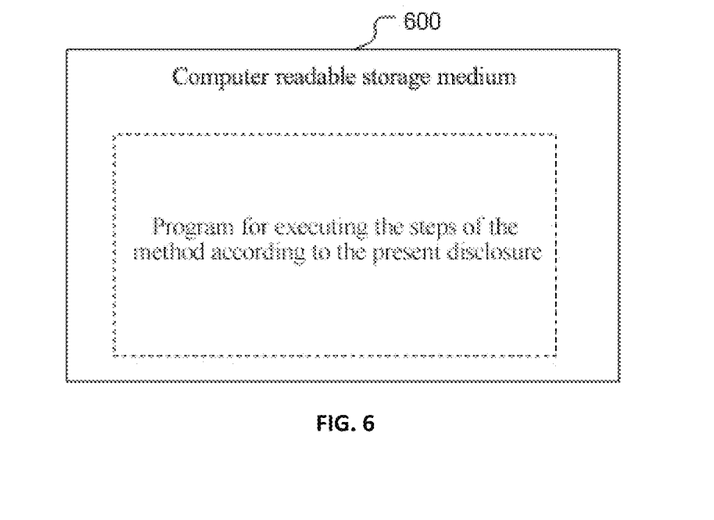
FIG. 6 shows a schematic structural diagram of the computer readable storage medium according to an embodiment of the present application.

Referring to FIG. 6, another embodiment of the present application provides a computer readable program code 600, wherein the computer readable storage medium stores a computer program, and the computer program causes a computer to execute the method for filtering image feature points in the above process embodiment.

Particularly, the computer program causes the computer to execute the following method for filtering image feature points:

providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;

after one time of filtering has started up, acquiring one frame of an original image and extracting feature points in the original image;

inputting the original image and the feature points in the original image into the neural-network model, obtaining quality score values corresponding to the feature points in the original image and outputting the quality score values corresponding to the feature points in the original image; and according to the quality score values corresponding to the feature points in the original image and a preset filtering rule, filtering the feature points in the original image.

Optionally, the computer program further causes the computer to execute the following method for filtering image feature points:

according to the image, the feature points in the image and the quality score values corresponding to the feature points in the image, generating a sample, training the neural-network model by using the generated sample, and updating predicted values of the quality score values of the neural-network model, to be used in a next time of filtering.

Optionally, the computer program further causes the computer to execute the following method for filtering image feature points:

according to the image and the feature points in the image, obtaining a mask image;

according to the image, the feature points in the image and the quality score values corresponding to the feature points in the image, obtaining a mask-value image, wherein values of pixel points in the mask-value image that correspond to the feature points are the quality score values corresponding to the feature points; and according to the image, the mask image and the mask-value image, generating the sample.

Optionally, the computer program further causes the computer to execute the following method for filtering image feature points:

when the image and a next image frame of the image have therebetween a feature point that has been successfully matched, tracking the feature point extracted from the image; and in the process of the tracking, performing summation operation to the quality score value of the feature point in the current frame and the quality score values of the feature point in the tracking frames, obtaining the sum value, and replacing the quality score value corresponding to the feature point in the mask-value image by the sum value;

wherein the quality score value in each tracking frame is determined according to a product of the quality score value of the feature point in the previous one frame of the tracking frame times a discount factor, wherein the discount factor is a constant greater than 0 and less than 1.

Optionally, the computer program further causes the computer to execute the following method for filtering image feature points:

when the preset filtering rule is a threshold filtering rule, filtering out feature points in the original image whose quality score values are not greater than a preset quality-score-value threshold; and when the preset filtering rule is a ranking filtering rule, according to magnitudes of the quality score values corresponding to the feature points in the original image, performing descending sorting to the feature points in the original image, and filtering out a preset quantity of the feature points in the original image that have low ranks.

The particular functions that are implemented by the computer programs of the above embodiment of the computer readable storage medium may refer to the particular contents of the above corresponding embodiments of the method for filtering image feature points, and are not discussed here further.

A person skilled in the art should understand that the embodiments of the present application may be provided as a method, a system, or a computer program product. Therefore, the present application may take the form of an entire hardware embodiment, an entire software embodiment, or an embodiment combining software and hardware. Furthermore, the present application may take the form of a computer program product embodied on one or more computer usable storage media (including, but not limited to, disk storage, CD-ROMs, optical memories, etc.) having a computer usable program code recorded thereon.

The present application is described with reference to flow charts and/or block diagrams of the method, the device (system), and the computer program product according to the embodiments of the present application. It should be understood that each flow and/or block in the flow charts and/or block diagrams, and combinations of the flows and/or blocks in the flow charts and/or block diagrams, may be implemented by computer program instructions. The computer program instructions may be provided to a processor of a general-purpose computer, a special-purpose computer, an embedded processor, or other programmable data processing device to generate a machine, so that a device for implementing the functions specified in one or more flows of the flow charts and/or one or more blocks of the block diagrams can be generated by instructions executed by the processor of the computers or the other programmable data processing device.

It should be noted that the terms "include", "comprise" or any variants thereof are meant to cover non-exclusive inclusions, so that processes, methods, articles or devices that include a series of elements do not only include those elements, but also include other elements that are not explicitly listed, or include the elements that are inherent of such processes, methods, articles or devices.

The above are merely particular embodiments of the present application. By the teaching of the present application, a person skilled in the art can make other modifications or variations on the basis of the above embodiments. A person skilled in the art should understand that the above particular descriptions are only for the purpose of better interpreting the present application, and the protection scope of the present application should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for filtering image feature points, wherein the method for filtering image feature points comprises:

providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;

after one time of filtering has started up, acquiring one frame of an original image and extracting feature points in the original image;

inputting the original image and the feature points in the original image into the neural-network model, obtaining quality score values corresponding to the feature points in the original image and outputting the quality score values corresponding to the feature points in the original image; and according to the quality score values corresponding to the feature points in the original image and a preset filtering rule, filtering the feature points in the original image.

2. The method according to claim 1, wherein the step of, according to the feature points and the quality score values of the feature points, training the neural-network model comprises:

according to the image, the feature points in the image and the quality score values corresponding to the feature points in the image, generating a sample, training the neural-network model by using the generated sample, and updating predicted values of the quality score values of the neural-network model, to be used in a next time of filtering.

3. The method according to claim 2, wherein the step of providing quality score values to feature points extracted from the image comprises:

setting a same initial value or different initial values to the quality score values of the feature points extracted from the image.

4. The method according to claim 2, wherein the step of, according to the image, the feature points in the image and the quality score values corresponding to the feature points in the image, generating the sample comprises:

according to the image and the feature points in the image, obtaining a mask image;

according to the image, the feature points in the image and the quality score values corresponding to the feature points in the image, obtaining a mask-value image, wherein values of pixel points in the mask-value image that correspond to the feature points are the quality score values corresponding to the feature points; and according to the image, the mask image and the mask-value image, generating the sample.

5. The method according to claim 4, wherein the step of, according to the image, the mask image and the mask-value image, generating the sample comprises:
   when the image and a next image frame of the image have therebetween a feature point that has been successfully matched, tracking the feature point extracted from the image; and
   in the process of the tracking, performing summation operation to the quality score value of the feature point in the current frame and the quality score values of the feature point in the tracking frames, obtaining the sum value, and replacing the quality score value corresponding to the feature point in the mask-value image by the sum value;
   wherein the quality score value in each tracking frame is determined according to a product of the quality score value of the feature point in a previous frame of the tracking frame times a discount factor, wherein the discount factor is a constant greater than 0 and less than 1.

6. The method according to claim 5, wherein
   the quality score value of the feature point in the current frame in each time of the tracking is updated by using the following formula:

$$V = \sum_{s=0}^{k} \lambda^s v$$

wherein $0<\lambda<1$ and $\lambda$ is the discount factor, v is the quality score value of the previous one frame of each of the tracking frames, s is a tracking-frame depth, k is a threshold of the tracking-frame depth, and V represents a sum value.

7. The method according to claim 4, wherein the step of training the neural-network model by using the generated sample comprises:
   adding to the neural-network model a first input channel for receiving the mask image and a second input channel for receiving the mask-value image;
   inputting the images in the sample into the neural-network model via the input channels of the neural-network model, inputting the mask image and the mask-value image into the neural-network model respectively via the first input channel and the second input channel, based on a mean-square-error loss function, calculating an error between the quality score values in the mask-value image in the sample and the predicted values of the quality score values of the neural-network model, and according to the error determining new predicted values of the quality score values of the neural-network model, to realize updating the predicted values of the quality score values of the neural-network model.

8. The method according to claim 4, wherein the step of, according to the image, the mask image and the mask-value image, generating the sample comprises:
   when the image and a next image frame of the image do not have therebetween a feature point that has been successfully matched, not tracking the feature point extracted from the image, but directly, according to the image, the mask image and the mask-value image, generating the sample.

9. The method according to claim 4, wherein
   the values of the pixel points in the mask image that correspond to the feature points are 256, and values of remaining pixel points are 0.

10. The method according to claim 1, wherein the step of, according to the quality score values corresponding to the feature points in the original image and the preset filtering rule, filtering the feature points in the original image comprises:
    when the preset filtering rule is a threshold filtering rule, filtering out feature points in the original image whose quality score values are not greater than a preset quality-score-value threshold; and
    when the preset filtering rule is a ranking filtering rule, according to magnitudes of the quality score values corresponding to the feature points in the original image, performing descending sorting to the feature points in the original image, and filtering out a preset quantity of the feature points in the original image that have low ranks.

11. A terminal, wherein the terminal comprises a device for filtering image feature points, wherein
    the device for filtering image feature points comprises:
    a model training module, configured for providing quality score values to feature points extracted from an image, and according to the feature points and the quality score values of the feature points, training a neural-network model, wherein, in a process of the training, a quality score value of a feature point in a current-frame image is determined based on both of a quality score value of the feature point in a current frame and quality score values of the feature point in tracking frames, and the tracking frames include a preset quantity of successive frames subsequent to the current frame that are tracked;
    a feature extracting module, configured for after one time of filtering has started up, acquiring one frame of an original image and extracting feature points in the original image;
    a score-value determining module, configured for inputting the original image and the feature points in the original image into the neural-network model, obtaining quality score values corresponding to the feature points in the original image and outputting the quality score values corresponding to the feature points in the original image; and
    a filtering module, configured for according to the quality score values corresponding to the feature points in the original image and a preset filtering rule, filtering the feature points in the original image.

12. The terminal according to claim 11, wherein the model training module is configured for according to the image, the feature points in the image and the quality score values corresponding to the feature points in the image, generating a sample, training the neural-network model by using the generated sample, and updating predicted values of the quality score values of the neural-network model, to be used in a next time of filtering.

13. The terminal according to claim 12, wherein
    the model training module is configured for according to the image and the feature points in the image, obtaining a mask image; according to the image, the feature points in the image and the quality score values corresponding to the feature points in the image, obtaining a mask-value image, wherein values of pixel points in the mask-value image that correspond to the feature points are the quality score values corresponding to the feature points; and according to the image, the mask image and the mask-value image, generating the sample.

14. The terminal according to claim 12, wherein the model training module is configured for when the image and a next image frame of the image have therebetween a feature point that has been successfully matched, tracking the feature point extracted from the image; and in the process of the tracking, performing summation operation to the quality score value of the feature point in the current frame and the quality score values of the feature point in the tracking frames, obtaining the sum value, and replacing the quality score value corresponding to the feature point in the mask-value image by the sum value; wherein the quality score value in each tracking frame is determined according to a product of the quality score value of the feature point in a previous frame of the tracking frame times a discount factor, wherein the discount factor is a constant greater than 0 and less than 1.

* * * * *